US011127062B2

(12) United States Patent
Chatwin et al.

(10) Patent No.: US 11,127,062 B2
(45) Date of Patent: Sep. 21, 2021

(54) SYSTEMS AND METHODS FOR PROMOTING PRODUCTS IN PRODUCT SEARCH RESULTS USING TRANSFER LEARNING WITH ACTIVE SAMPLING

(71) Applicant: WAL-MART STORES, INC., Bentonville, AR (US)

(72) Inventors: Richard Edward Chatwin, Los Altos Hills, CA (US); Jaymin Daniel Mankowitz, Haifa (IL); Shie Mannor, Haifa (IL); Vineet Abhishek, Mountain View, CA (US)

(73) Assignee: WALMART APOLLP, LLC, Bentonville, AR (US)

( * ) Notice: Subject to any disclaimer, the term of this patent is extended or adjusted under 35 U.S.C. 154(b) by 929 days.

(21) Appl. No.: 15/413,033

(22) Filed: Jan. 23, 2017

(65) Prior Publication Data

US 2018/0211303 A1 Jul. 26, 2018

(51) Int. Cl.
*G06Q 30/00* (2012.01)
*G06Q 30/06* (2012.01)
*G06N 20/00* (2019.01)
*G06F 16/28* (2019.01)
*G06F 16/951* (2019.01)

(52) U.S. Cl.
CPC ....... *G06Q 30/0625* (2013.01); *G06F 16/285* (2019.01); *G06F 16/951* (2019.01); *G06N 20/00* (2019.01)

(58) Field of Classification Search
CPC .................................. G06Q 30/0601–0645
See application file for complete search history.

(56) References Cited

U.S. PATENT DOCUMENTS

| | | | | |
|---|---|---|---|---|
| 2009/0012971 A1* | 1/2009 | Hunt | ............. | G06Q 30/02 |
| 2013/0132311 A1* | 5/2013 | Liu | ............. | G06K 9/00718 |
| | | | | 706/12 |

OTHER PUBLICATIONS

"Weiss, Karl, A survey of transfer learning, 2016, Journal of Big Data, pp. 1-40" (Year: 2016).*

(Continued)

*Primary Examiner* — William J Allen
*Assistant Examiner* — Marias S. P. Heath
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of training a source classifier with labeled source training data of a first product category from a website of an online retailer, clustering target data for a second product category into a plurality of clusters, inserting into each cluster labeled source training data of the first product category, assigning a domain discriminator score to each cluster, determining whether each cluster comprises an agreement cluster or a disagreement cluster using the domain discriminator score, receiving a product search request for a product of the second category from a user of the web site, and coordinating a display of the product on the web site to promote the product.

24 Claims, 5 Drawing Sheets

(56) References Cited

OTHER PUBLICATIONS

Saha, A., Rai, P., Daume III, H., Venkatasubramanian, S., Duvall, S., "Active Supervised Domain Adaptation" School of Computing, Univ. of Utah, Dept. of Computer Science, Univ. of Maryland CP, VA SLC Healthcare System & Univ. of Utah, European Conf. on Machine Learning (2011).

Agrawal, S., Goyal, N., "Analysis of Thompson Sampling for the Multi-armed Bandit Problem", Workshop & Conf. Proceedings vol. 23 (2012) 39. 1-39.26, 25th Annual Conf. on Learning Theory (2012).

Kale, D., Ghazvininejad, M., Ramakrishna, A., He, J., Liu, Y., "Hierarchical Active Transfer Learning", Viterbi School of Engineering, Univ. of So. California, Arizona State Univ. (May 1, 2015).

Shai, B., Blitzer, J., Crammer, K., Pereira, F., "Analysis of Representations for Domain Adaptation", Univ. of Waterloo, Univ. of Pennsylvania, Neural Information Processing Systems (2006).

Jiang, J., "A Literature Survey on Domain Adaptation of Statistical Classifers" Mar. 2008.

Settles, B., "Active Learning Literature Survey," Computer Sciences Technical Report 1648, Univ. of Wisconsin-Madison Jan. 26, 2010.

Ben-David, S., Blitzer, J., Crammer, K., and Pereira, F., "Analysis of Representations for Domain Adaptation," Advances in Neural Information Processing Systems 19, pp. 137-144 2006.

Masci J., Meier, U., Ciresan, D., and Schmidhuber, J., "Stacked Convolutional Auto-Encoders for Hierarchial Feature Extraction", ICANN 2011, Part 1, LNCS 6791, pp. 52-59 2011.

Luo, C., Ji, Y., Dai, X., and Chen, J., "Active Learning With Transfer Learning," Proceedings of the 2012 Student Research Workshop, pp. 13-18 Jul. 2012.

Kifer, D., Ben-David, S., and Gehrke, J., "Detecting Change in Data Streams," Proceedings of the 30th VLDB Conference, Toronto, Canada, pp. 180-191 2004.

Dasgupta, S., and Hsu, D., "Hierarchical Sampling for Active Learning," Proceedings of the 25th Interantional Conference on Machine Learning, Helsinki, Finland 2008.

Kale, D., et al., "Hierarchical Active Transfer Learning," Proceedings of the 2015 SIAM International Conference on Data Mining 2015.

Rai, P., Saha, A., Daume III, H, and Venkatasubramanian, S., "Domain Adaptation Meets Active Learning," Proceedings of the NAACL HLT 2010 Workshop on Active Learning for Natural Language Processing, pp. 27-32 Jun. 2010.

Ramos, J., "Using TF-IDF to Determine Word Relevance in Document Queries" 2003.

Blitzer, J., et al., "Learning Bounds for Domain Adaptation," Advances in Neural Information Processing Systems 20 (NIPS 2007) 2007.

Saha, A., et al., "Active Supervised Domain Adaptation," Machine Learning and Knowledge Discovery in Databases, Lecture Notes in Computer Science, vol. 6913 2011.

Daume, III, H., and Marcu, D., "Domain Adaptation for Statistical Classifiers," Journal of Artificial Intelligence Research 26, pp. 101-126 May 2006.

Agrawal, S., and Goyal, N., "Analysis of Thompson Sampling for the Multi-Armed Bandit Problem," JMLR: Workshop and Conference Proceedings, vol. 23, pp. 39.1-39.26 2012.

\* cited by examiner

400

405 – Training a source classifier with labeled source training data of a first product category from a website of an online retailer.

410 – Clustering target data for a second product category into a plurality of clusters such that each cluster of the plurality of clusters comprises a different portion of the target data.

415 – Inserting into each cluster of the plurality of clusters a different holdout set of source data from the labeled source training data of the first product category.

420 – Training a domain discriminator using a first additional holdout set of source data from the labeled source training data and a second additional holdout set of data from the target data.

425 – Assigning a domain discriminator score to each cluster of the plurality of clusters by calculating an approximate H-distance between the different holdout set of source data and the different portion of the target data within each cluster of the plurality of clusters.

430 – Determining an agreement threshold for each cluster of the plurality of clusters based in part on the domain discriminator score for the cluster

435 – Determining whether each cluster of the plurality of clusters comprises an agreement cluster of one or more agreement clusters or a disagreement cluster of one or more disagreement clusters using the agreement threshold for each cluster and a first set of rules.

440 – Receiving a product search request from a user of the website of the online retailer for a product in the second product category that belongs to one of the clusters of the plurality of clusters determined to comprise the one or more agreement clusters.

445 – Coordinating a display of the product on the website of the online retailer to promote a product of the second category.

SYSTEMS AND METHODS FOR PROMOTING PRODUCTS IN PRODUCT SEARCH RESULTS USING TRANSFER LEARNING WITH ACTIVE SAMPLING

TECHNICAL FIELD

This disclosure relates generally to promoting products in product search results.

BACKGROUND

There are many applications where two learning problems share similar characteristics but are not generated by the same distribution. For example, consider spam mail where cooking mails may be considered as spam for one type of user (domain A), and informative for another type of user (domain B). This consideration can refer to a change in the conditional output distribution and occurs when tasks are evaluated on different populations or settings.

There also are applications where two learning problems have similar, but not identical, (1) input distributions and (2) conditional output distributions. For example, a website of an online retailer can have a learning problem of predicting whether an item will have a high or low probability of being purchased. The website of some online retailers can be divided into a taxonomy of different categories, such as Men's Shoes (domain A) and Women's Shoes (domain B). A separate learning problem can be defined for each category. The input distributions (i.e., products) across these categories can share some characteristics such as brands (e.g., NIKE®, Adidas®), shoe types (e.g., cross-trainers) and colors. The products, however, can differ in gender and, in some instances, shoe types as well (e.g., high-heels, cocktail shoes). The conditional output distribution also is not identical across categories because different populations (e.g., men and women) are searching for and purchasing these items. In the above problems, due to the underlying changes in distributions, a predictor trained on domain A may perform poorly on domain B.

BRIEF DESCRIPTION OF THE DRAWINGS

To facilitate further description of the embodiments, the following drawings are provided in which:

FIG. 4 is a flowchart for a method, according to certain embodiments; and

Figure 1:
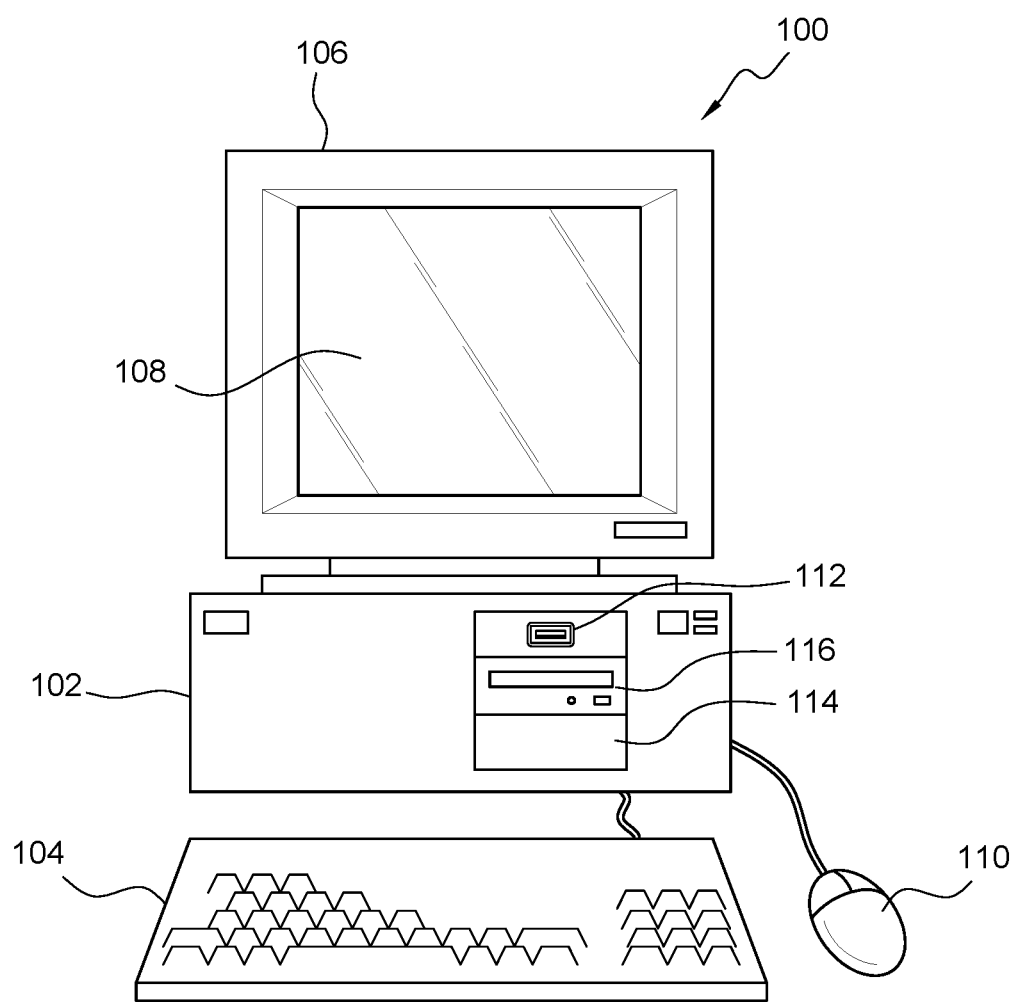
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of training a source classifier with labeled source training data of a first product category from a website of an online retailer. The labeled source training data can be based on a plurality of first products in the first product category. The one or more storage modules also can be configured to run on the one or more processing modules and perform an act of clustering target data for a second product category into a plurality of clusters such that each cluster of the plurality of clusters comprises a different portion of the target data. The target data can be based on a plurality of second products in the second product category. The one or more storage modules also can be configured to run on the one or more processing modules and perform an act of inserting into each cluster of the plurality of clusters a different holdout set of source data from the labeled source training data of the first product category. The one or more storage modules also can be configured to run on the one or more processing modules and perform an act of assigning a domain discriminator score to each cluster of the plurality of clusters. The one or more storage modules also can be configured to run on the one or more processing modules and perform an act of determining whether each cluster of the plurality of clusters comprises an agreement cluster of one or more agreement clusters or a disagreement cluster of one or more disagreement clusters using the domain discriminator score for each cluster of the plurality of clusters and a first set of rules. The different portion of the target data within each agreement cluster of the one or more agreement clusters can be explained by the source classifier, and the different portion of the target data within each disagreement cluster of the one or more disagreement clusters cannot explained by the source classifier. The one or more storage modules also can be configured to run on the one or more processing modules and perform an act of receiving a product search request from a user of the web site of the online retailer for a product of the plurality of second products in the second product category. The one or more storage modules also can be configured to run on the one or more processing modules and perform an act of coordinating a display of the product on the website of the online retailer to promote the product according to any clusters of the plurality of clusters determined to comprise the one or more agreement clusters.

Various embodiments include a method. The method can include training a source classifier with labeled source training data of a first product category from a website of an online retailer. The labeled source training data can be based on a plurality of first products in the first product category. The method also can include clustering target data for a second product category into a plurality of clusters such that each cluster of the plurality of clusters comprises a different portion of the target data. The target data can be based on a plurality of second products in the second product category. The method also can include inserting into each cluster of the plurality of clusters a different holdout set of source data from the labeled source training data of the first product category. The method also can include assigning a domain discriminator score to each cluster of the plurality of clusters. The method also can include determining whether each cluster of the plurality of clusters comprises an agreement cluster of one or more agreement clusters or a disagreement cluster of one or more disagreement clusters using the domain discriminator score for each cluster of the plurality of clusters and a first set of rules. The different portion of the target data within each agreement cluster of the one or more agreement clusters can be explained by the source classifier, and the different portion of the target data within each disagreement cluster of the one or more disagreement clusters cannot explained by the source classifier. The method also can include receiving a product search request from a user of the website of the online retailer for a product of the plurality of second products in the second product category. The method also can include coordinating a display of the product on the web site of the online retailer to promote the product according to any clusters of the plurality of clusters determined to comprise the one or more agreement clusters.

Figure 2:
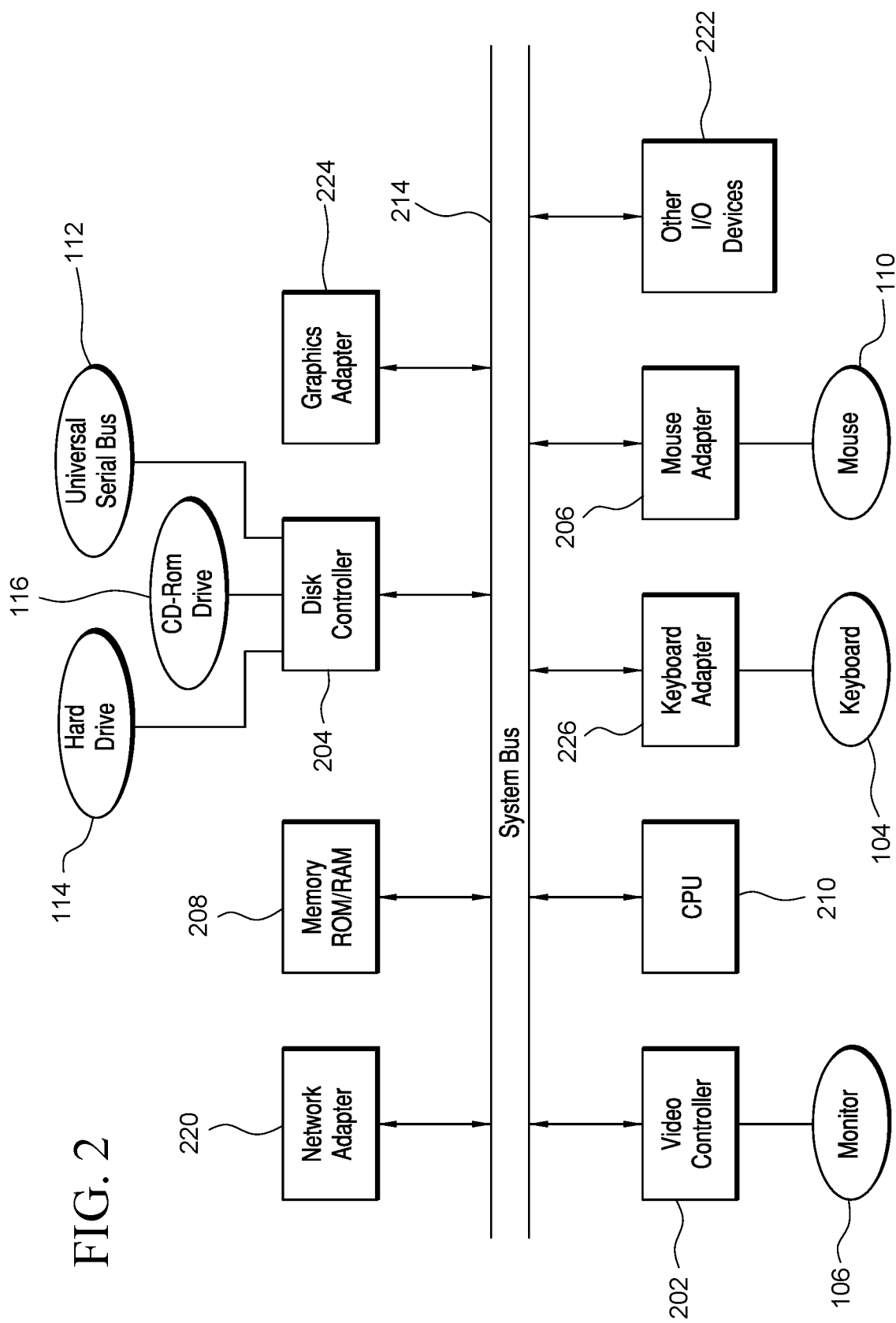
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
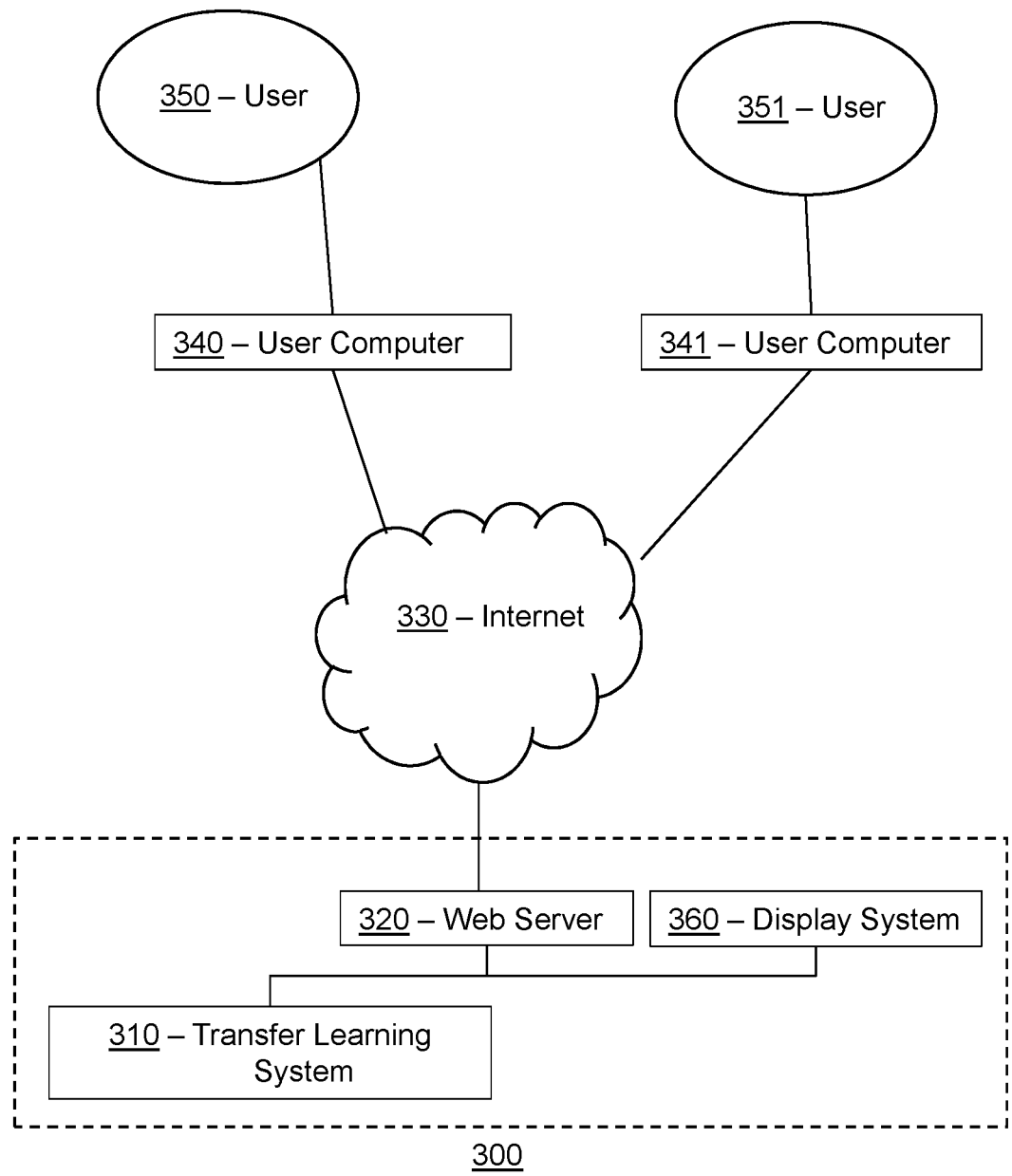
FIG. 3 illustrates a representative block diagram of a system, according to an embodiment.

Turning ahead in the drawings, FIG. 3 illustrates a block diagram of a system 300 that can be employed for promoting products in a product search results using transfer learning with active sampling, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a transfer learning system 310, a web server 320, and a display system 360. Transfer learning system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of transfer learning system 310, web server 320, and display system 360. Additional details regarding transfer learning system 310, web server 320, and display system 360 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, transfer learning system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) transfer learning system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of transfer learning system 310, web server 320, and/or display system 360. In a similar manner, the processing module(s) and the memory storage module(s) can be local and/or remote to each other.

In many embodiments, transfer learning system 310, web server 320, and/or display system 360 can be configured to communicate with one or more user computers 340 and 341. In some embodiments, user computers 340 and 341 also can be referred to as customer computers. In some embodiments, transfer learning system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, transfer learning system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, transfer learning system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between transfer learning system 310, web server 320, and/or display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
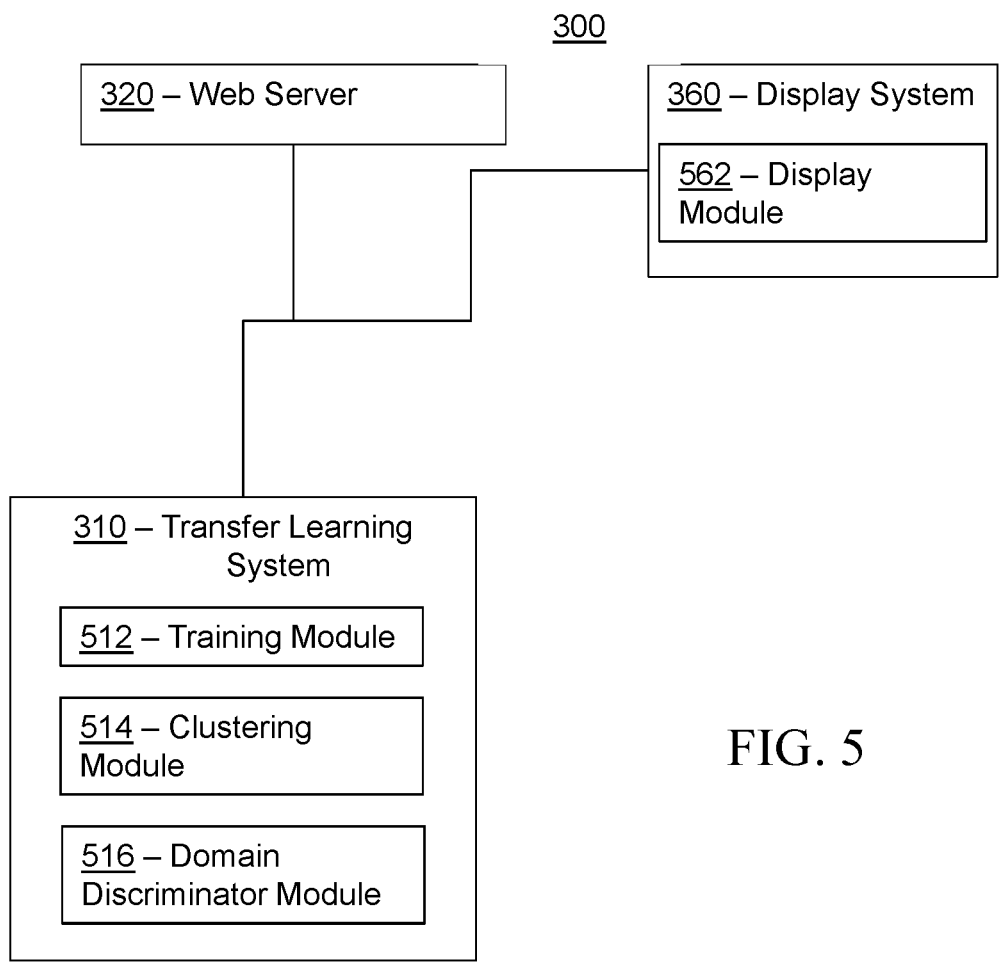
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 516, and/562 (FIG. 5). Such non-transitory memory storage modules can be part of a computer system such as transfer learning system 310, web server 320, and/or display system 360 (FIGS. 3 & 5). The processing module(s) can be similar or identical to the processing module(s) described above with respect to computer system 100 (FIG. 1).

In a typical transfer learning setting, a source domain is given with a large amount of labeled data and a target domain is given with a large amount of unlabeled data. A small budget of target labels can be revealed at a cost. Described herein is an Active Sampling Transfer Learning (ASTraL) framework that is able to adapt a classifier that is trained on the source domain (or labeled source training data) to provide high-performance classification on a target domain (or unlabeled target data). In some embodiments, this high-performance classification can be achieved by utilizing an improved Multi-Armed Bandit Active Sampling (MAB-AS) algorithm that actively selects target labels that fall into regions where the change between the source domain and the target domain is most evident. Data sets utilizing embodiments of the methods and systems disclosed herein show ASTraL outperforming a number of baseline techniques. In some embodiments, ASTraL significantly outperforms a classifier trained on target labels revealed at random.

There are many applications where two learning problems share similar characteristics but are not generated by the same exact distribution. For example, consider spam mail where cooking mails may be considered as spam for one type of user (domain A), and informative for another type of user (domain B). This consideration can refer to a change in the conditional output distribution and occurs tasks are evaluated on different populations or settings.

There also are applications where two learning problems have similar, but not identical, (1) input distributions and (2) conditional output distributions. For example, a website of an online retailer can have a learning problem of predicting whether an item will have a high or low probability of being purchased. The website of some online retailers can be divided into a taxonomy of different categories, such as Men's Shoes (domain A) and Women's Shoes (domain B). A separate learning problem can be defined for each category. The input distributions (i.e., products) across these categories can share some characteristics such as brands (e.g., Nike®, Adidas®), shoe types (e.g., cross-trainers) and colors. The products, however, can differ in gender and, in some instances, shoe types as well (e.g., high-heels, cocktail shoes). The conditional output distribution also is not identical across categories because different populations (e.g., men and women) are searching for and purchasing these items.

In the above problems, due to the underlying changes in distributions, a predictor trained on domain A may perform poorly on domain B. In some embodiments, systems and methods of this disclosure can perform a transfer learning where the predictor adapts to the input distribution of domain B, thus generating a higher performance on domain B. In a typical transfer learning setting, the source domain is assumed to have a large amount of labeled data and is well understood. The target domain can comprise a small budget of labeled data and is not well understood. As such, it is necessary for the predictor to adapt to solve the problem of classifying the target domain.

In some embodiments, systems and methods described herein can identify regions in the target domain that can be explained well by the source predictor. These regions are referred to as agreement regions or agreement clusters. These agreement regions or agreement clusters can be classified by the original predictor. In some embodiments, systems and methods described herein also can actively sample data (under a given budget) in target regions that are not explained well by the source predictor. The data sampled in the target regions can be utilized to adapt the predictor to attain higher performance on the target. These regions are referred to as disagreement regions or disagreement clusters. Active sampling in disagreement clusters, where the change between domains is most evident, can be advantageous to better aid adaptation between problems. In addition, active sampling in disagreement clusters using some embodiments of systems and methods disclosed herein can outperform a scheme that samples target data at random.

Various active learning techniques can be used to actively sample data to perform transfer learning between domains. Two prominent techniques are Active Learning Domain Adapted (ALDA) and Hierarchical Active Transfer Learning (HATL). ALDA provides a principled approach towards active learning in a target domain by leveraging information from a related source domain. In some embodiments, ALDA can be used in reweighting the source data using unlabeled data to bring the input distributions closer. ALDA can then be used to train a generic active classifier that samples from the target. In addition, a domain discriminator can be utilized to determine whether a selected target example should have its label queried or its label should be predicted by the source classifier. This algorithm is limited to changes in the input distributions between domains. HATL combines the active learning algorithm hierarchical sampling for active learning (HSAL), which uses hierarchical clustering to determine where to sample, with source knowledge. HATL does not consider a sampling strategy of sampling disagreement region clusters as we will propose in our framework.

In some embodiments, the ASTraL framework is able to identify agreement clusters and disagreement clusters between a source and target domain using an improved MAB-AS strategy. ASTraL can focus on sampling target data from disagreement clusters as much as possible, as the agreement clusters can be classified by the source predictor. Actively sampled disagreement region data can be utilized to learn a predictor that has higher performance on the target domain. Advantages of the systems and method disclosed herein can include: (1) an MAB-AS framework for transfer learning, which can exploit cluster structure in the data to identify agreement and disagreement clusters; (2) a first theorem which bounds or limits the number of sub-optimal arm selections for the MAB; (3) a second theorem which bounds or limits the error of the source predictor on agreement cluster data; (4) superior performance of the ASTraL adapted predictors, using sampled disagreement data, compared to the baseline active sampling techniques; and (5) superior performance of the the ASTraL adapted predictors when utilizing a shared feature representation attained from training a Deep Stacked Auto-encoder.

Transfer Learning/Domain Adaptation

In many machine learning applications, a plethora of labeled data is available for one domain (the source domain), and a statistical model, trained using this data, is desired that performs well on another related, but nonidentical domains (the target domain). In a target domain, very little labeled data is available, and labels can only be attained at a cost. Therefore, leveraging the labeled source data can be used to acquire as few labels as possible from the target data in order to adapt a statistical model to perform well on the target domain. This process can be referred to as transfer learning or supervised domain adaptation.

Active Learning

Active learning can be used in modern machine learning problems where data is available in abundance, yet labels are scarce or expensive to obtain. In active learning, an oracle is queried to identify the labels of specific data instances chosen by the active learning algorithm. The active learner aims to achieve higher classification accuracy by revealing as few labels as possible to reduce the cost of obtaining labeled data.

Active Learning Meets Domain Adaptation

In supervised domain adaptation, labels can be intelligently revealed in the target domain, because revealing labels comes at a cost and is subject to a budget constraint. Active learning is thus utilized to reveal target labels that can be used to adapt the statistical model, trained previously on the labeled source, to attain high performance on the target.

The $\mathcal{H}$-Distance

Given source and target domains with input distributions of D and D' respectively (where D is an input distribution for a source domain and D' is an input distribution for target domains), it is often useful to measure a distance between input distributions. The measure of distance between two distributions is defined using the H-distance. Let H be a hypothesis class on instance space X where a hypothesis function h∈H is defined h:X→{0,1}, and let $\mathcal{A}_\mathcal{H}$ be a set of subsets of X that are the support of some hypothesis in H. That is, for every h∈H, {x:x∈X, h(x)=1}∈$\mathcal{A}_\mathcal{H}$. Then the distance between two distributions can be defined as: $d_\mathcal{H}(D,D') = 2 \sup_{A \in \mathcal{A}_\mathcal{H}} |[P_D(A) - P_{D'}(A)]|$ where $P_D(\mathcal{A})$ is the probability of subset $\mathcal{A}$ given distribution D. Computing the $\mathcal{H}$-C-distance has a number of advantages, such as it can be computed using only unlabeled data instances. In addition, a finite-sample approximation to $d_\mathcal{H}$ can be computed by finding a classifier that maximally discriminates between unlabeled instances from D and D'.

In a domain adaptation setting, a domain discriminator, described in greater detail below, between the source domain and the target domain can be used to approximate the $\mathcal{H}$-distance. Intuitively, a small $\mathcal{H}$-distance between the source and target domain indicates that the data is similar and can be explained by the statistical model trained on the source domain. A large distance indicates dissimilarity between domains and therefore adaptation is necessary to explain the target data.

Bernoulli MABs with Thompson Sampling

A typical MAB setting can include K arms where, at each time-step t=1, 2, 3 . . . , one of the K arms must be chosen for use. In some embodiments, multiple arms of the MAB can be selected for use at time step. Once an arm i is used, it yields a real-valued reward $r_{i,t}$ immediately after using the arm, according to some fixed unknown distribution in [0,1]. $\mu_i$ can be defined as the unknown expected reward for playing arm i. The MAB algorithm needs to decide which arm to use at time t based on the previous t−1 outcomes in order to maximize the total reward, or alternatively to minimize the expected regret. That is, if $\mu^* = \max_{j,\mu_j}$, $\Delta_i = \mu^* - \mu_i$ and $k_i(t)$ is the number of times arm i has been used up until time t−1, then the expected total regret up until time T is:

$$\mathbb{E}\left[\sum_{t=1}^T (\mu^* - \mu_{i(t)})\right] = \sum_i \Delta_i \cdot \mathbb{E}[k_i(T)].$$

For a Bernoulli MAB with Thompson Sampling, the rewards $r_{i,t} = \{0,1\}$ and for arm i, the probability of success $(r_{i,t}=1)$ is $\mu_i$. A Beta (1,1) distribution is chosen as a prior over the Bernoulli means because once a Bernoulli trial is observed, the posterior distribution is simply Beta($\alpha$+1, $\beta$) or Beta($\alpha$, $\beta$+1) depending on whether a success or failure resulted. The algorithm then samples from these posterior distributions and plays an arm according to its probability of its mean being the largest.

ASTraL Algorithm Overview

In some embodiments, an ASTraL algorithm can be divided into four stages: (1) training the source classifier, (2) clustering, (3) incorporating domain discrimination and (4) active sampling. The end-result of some embodiments of the ASTraL algorithm is a set of clusters that are defined as being either agreement or disagreement regions.

Training Source Classifier

In some embodiments, a first step in the ASTraL algorithm is training the source classifier, with the labeled source training data, using a supervised algorithm that best suits the characteristics of the source data. Because a plethora of labeled source data is available, this classifier should have a small prediction error on the source domain. Thus, returning to FIG. 4, in some embodiments method 400 can comprise an activity 405 of training a source classifier with labeled source training data of a first product category from a website of an online retailer. The labeled source training data can be based on a plurality of first products in the first product category. For example, a source classifier can be trained to predict a selling performance of products in a particular product category, like men's shoes.

Clustering

The agreement and disagreement regions are represented in this framework as clusters. Therefore, the next step is to cluster the data. First the target data is clustered using any generic clustering algorithm. Thus, returning to FIG. 4, in some embodiments, method 400 can comprise an activity 410 of clustering target data for a second product category into a plurality of clusters such that each cluster of the plurality of clusters comprises a different portion of the target data. In some embodiments, the target data can comprise unlabeled target data. The target data can be based on a plurality of second products in the second product category. In some embodiments, the target data can be based on information for the second product category. For example, if the product category is all women's shoes, then the target data can be all types of women's shoes stored in a database of an online retailer that correspond to a women's shoes product category. The target data for the second product category can be different in each cluster of the plurality of clusters. That is, a first cluster of the plurality of clusters can comprise a first portion of the target data, and a second cluster of the plurality of clusters can comprise a second portion of the target data that can be entirely different than the first portion of the target data.

Next, a holdout set from the labeled source data can be fed into the clusters, resulting in clusters containing target data and labeled source data. Thus, in some embodiments, method 400 also can comprise an activity 415 of inserting into each cluster of the plurality of clusters a different holdout set of source data from the labeled source training data of the first product category. The data of the holdout set of source data can be more relevant to the particular cluster to which the holdout set of source data is assigned than to other clusters. Furthermore, in some embodiments there is no overlap between holdout sets of data in the plurality of clusters. For example, a holdout data point assigned to a first cluster cannot be assigned to a second cluster in some embodiments. In some embodiments, the different holdout set of source data within each cluster of the plurality of clusters comprises data indicating a high probability of products from the first product category being sold and/or data indicating a low probability of products from the first product category being sold.

Incorporating the Domain Discriminator

A domain discriminator is trained using additional holdout sets of the unlabeled source and target data to approximate the $\mathcal{H}$-distance. Thus, in some embodiments, method 400 can optionally comprise an activity 420 of training a domain discriminator using a first additional holdout set of source data from the labeled source training data and a second additional holdout set of data from the target data. In some embodiments, method 400 also can optionally comprise an activity of using the domain discriminator and a loss function to approximate an H-distance between the different holdout set of source data of the labeled source training data and the different portion of the target data within each cluster of the plurality of clusters. In some embodiments, a small $\mathcal{H}$-distance indicates more similarity between the different holdout set of source data of the labeled source training data and the different portion of the target data in each cluster of the plurality of clusters than a large H-distance that is larger than the small H-distance. The approximate H-distance can be calculated as (1-hinge loss). The loss function can comprise one of a hinge loss function, a negative logarithmic loss function, a cross entropy loss function, a Huber loss function, a modified Huber loss function, an exponential loss function, a mean absolute deviation, or a Kullback-Leibler divergence.

A domain discriminator score can then be assigned to each cluster by calculating the loss for the source and target data within a particular cluster to provide a measure of the similarity of the data within each cluster. Thus, in some embodiments, method 400 can comprise an activity 425 of assigning a domain discriminator score to each cluster of the plurality of clusters by calculating a hinge loss between the different holdout set of source data and the different portion of the target data within each cluster of the plurality of clusters. A high hinge loss occurs when data in a cluster is similar, resulting in a low H-distance, while a low hinge loss occurs when data in a cluster is not similar, resulting in a high H-distance. In some embodiments, the hinge loss is between 0 and 1. Thus, if the holdout set of source data from the source is very similar to the target data, then the hinge loss will be close to 0. On the other hand, if the holdout set of source data from this source is very different from the target data, then the hinge loss will be close to 1.

MAB-AS Strategy

Using the clusters and the domain discriminator score, MAB-AS is able to determine the agreement and disagreement clusters respectively. To do so, the MAB-AS can define agreement/disagreement hypotheses that are key to the sampling strategy. A formal definition of the learning framework as well as the disagreement and agreement hypotheses are described in greater detail below. In some embodiments, method 400 can comprise an activity 430 of determining an agreement threshold for each cluster of the plurality of clusters based at least in part on the domain discriminator score. By way of non-limiting example, assigning an agreement threshold to each cluster of the plurality of clusters can comprise computing $$\varepsilon_i = \min\left(\alpha, \frac{P_S(c_i)}{P_T(c_i)}(\hat{\varepsilon}_S(\hat{f} \mid c_i) - CI(n_S(c_i)) + d_{Hc_i}(D_S, D_T))\right),$$

where $\alpha$ is a pseudo disagreement parameter, $P_S(c_i)$ is an input distribution of the different holdout set of source data of the labeled source training data in the cluster $c_i$, $P_T(c_i)$ is an input distribution of the different portion of the target data in the cluster $c_i$, $\hat{\varepsilon}_S$ is an empirical estimate of the error of the source classifier $\hat{f}$ on the different portion of the source data in a cluster $c_i$ of the plurality of clusters, CI is a confidence interval, $n_S(c_i)$ is a number of samples of the different holdout set of data of the labeled source training data in the cluster $c_i$, and $$d_{H,c_i}(D_S, D_T)$$

is the $\mathcal{H}$-distance as approximated between the different holdout set of source data from labeled source training data $D_S$ and the different portion of target data $D_T$ for the cluster $c_i$. More particularly, $\hat{\varepsilon}_S$ can be an empirical estimate of the error of the source classifier $\hat{f}$ on the source data in cluster $c_i$, where the empirical estimate is computed using the different portion of the source data in cluster $c_i$.

In some embodiments, method 400 can comprise an activity 435 of determining whether each cluster of the plurality of clusters comprises an agreement cluster of one or more agreement clusters or a disagreement cluster of one or more disagreement clusters using the agreement threshold for each cluster of the plurality of clusters and a first set of rules. In some embodiments, the different portion of the target data within each agreement cluster of the one or more agreement clusters is explained by the source classifier, and the different portion of the target data within each disagreement cluster of the one or more disagreement clusters is not explained by the source classifier.

Learning Framework

The transfer learning model for the ASTraL framework can be formally defined as follows: let X and Y be the common feature space and output space of the source and target domains. Each domain D is defined as having a probability distribution $P_D(x,y)$ and a marginal distribution $P_D(x)$ with a labelling function $f_D = P_D(y|x):X \to [0,1]$. From the source domain $D_S$, a large set of labeled examples $n_{S,l}$ are given as input. From the target domain, a large set of unlabeled examples $n_T$ are given. A budget of size $n_{T,l}$ also is given, which allows the label of $n_{T,l}$ target examples to be queried and revealed. For a given learning algorithm with a function class $\mathcal{F}$ of predictors, $f:X \to \{0,1\}$, $\hat{f} \in \mathcal{F}$ is the predictor learned by the algorithm when trained on the source examples only. The disagreement/agreement hypotheses can now be formulated, which hypotheses are used to actively sample the target data and generate the agreement/disagreement clusters. In some embodiments, the goal is to sample as often as possible in disagreement clusters such that we can utilize the revealed target labels to adapt the source classifier to perform well on the target data. In addition, identification of the agreement clusters as quickly as possible and labeling all of the unlabeled target data in these clusters using the source classifier also can be advantageous.

The Disagreement/Agreement Hypotheses

Given K clusters $C=\{c_1 \ldots c_k\}$ containing both source data and target data. The error of the source classifier $\hat{f}$ on the source data in cluster $c_i$ can be defined as $\epsilon_S(\hat{f}|c_i) = \mathbb{P}_{x,y \sim S}[\hat{f}(x) \neq y | x \in c_i]$. That is, the source classifier can predict source labels in each cluster. If the predicted label does not match the true source label, then an error occurs. $P_S(c_i)$ can be defined as the input distribution of the source domain on cluster $c_i$. The error on the cluster can, therefore, be defined as $$\varepsilon_{S,c_i}(\hat{f}) = P_S(c_i)\varepsilon_S(\hat{f}|c_i).$$

Similarly, $\epsilon_T(\hat{f}|c_i) = \mathbb{P}_{x,y \sim T}[\hat{f}(X) \neq y | x \in c_i]$ can be defined as the error of the source classifier on the target data in cluster $c_i$, and $P_T(c_i)$ can be defined as the input distribution of the target domain on cluster $c_i$. The error on the cluster with respect to the target data can be $$\varepsilon_{T,c_i}(\hat{f}) = P_T(c_i)\varepsilon_T(\hat{f}|c_i).$$

Sometimes, only a small budget $n_{T,l}$ of target labels is available that can be revealed from the target data. Thus, the error $\epsilon_T(\hat{f}|c_i)$ is estimated using the MAB-AS strategy described below. The disagreement/agreement hypotheses can now be defined.

In some embodiments, the first set of rules can comprise an agreement hypothesis and a disagreement hypothesis. The disagreement hypothesis can comprise $$\varepsilon_T(\hat{f}|c_i) > \frac{P_S(c_i)}{P_T(c_i)}(\varepsilon_S(\hat{f}|c_i) + d_{H,c_i}(D_S, D_T)).$$

The agreement hypothesis can comprise $$\varepsilon_T(\hat{f}|c_i) \leq \frac{P_S(c_i)}{P_T(c_i)}(\varepsilon_S(\hat{f}|c_i) + d_{H,c_i}(D_S, D_T)).$$

In the agreement hypothesis and the disagreement hypothesis, $\epsilon_T$ is an error of the source classifier $\hat{f}$ of the different portion of the target data in a cluster $c_i$ of the plurality of clusters, $\epsilon_s$ is an error of the source classifier $\hat{f}$ of the different portion of the source data in a cluster $c_i$ of the plurality of clusters, $P_S(c_i)$ is an input distribution of the different holdout set of source data of the labeled source training data in the cluster $c_i$, $P_T(c_i)$ is an input distribution of the different portion of the target data in the cluster $c_i$, and $$d_{H,c_i}(D_S, D_T)$$

is the $\mathcal{H}$-distance between the different holdout set of source data from labeled source training data $D_S$ and the different portion of target data $D_T$ for the cluster $c_i$. In some embodiments, a separate $\mathcal{H}$-distance is calculated for each cluster using the holdout set of source data of the labeled source training data and the portion of the target data.

In some embodiments, verifying for each cluster whether the error of the source classifier on the target domain $\epsilon_T(\hat{f}|c_i)$ is greater than the source error $\epsilon_S(\hat{f}|c_i)$ by at least $$d_{H,c_i}(D_S, D_T) \in [0, 1]$$

can be performed. Disagreement can be claimed if $$\varepsilon_T(\hat{f}|c_i) > \frac{P_S(c_i)}{P_T(c_i)}(\varepsilon_S(\hat{f}|c_i) + d_{H,c_i}(D_S, D_T)),$$

and agreement can be claimed if $$\varepsilon_T(\hat{f}|c_i) \leq \frac{P_S(c_i)}{P_T(c_i)}(\varepsilon_S(\hat{f}|c_i) + d_{H,c_i}(D_S, D_T)).$$

Given that the class of predictors $\mathcal{F}$ is sufficiently large and that the labeled source data is large, $\hat{f}$ can be a good proxy for the optimal classifier. Therefore, agreement occurs if $$\varepsilon_{T,c_i}(\hat{f}) \approx \varepsilon_{S,c_i}(\hat{f}).$$

The $\mathcal{H}$-distance represents the approximation error. If the source data and target data for cluster $c_i$ share similar structure $$d_{H,c_i}(D_S, D_T) \approx 0,$$

resulting in a lower approximation error and finer disagreement/agreement hypothesis criterion. For separable domains, $$d_{H,c_i}(D_S, D_T) \approx 1,$$

resulting in a larger approximation error and a rougher disagreement/agreement hypothesis criterion.

There also are instances where clusters may have large target errors. To encourage sampling in disagreement regions where the target errors are large, a pseudo-disagreement rate can be defined as $\alpha \in [0,1]$. Pseudo-disagreement is claimed if $\epsilon_T(\hat{f}|c_i) > \alpha$. This rate can ensure that clusters with large target errors will get sampled more often, improving performance in these clusters as well as encouraging disagreement region sampling. Combining this information into the agreement/disagreement hypotheses yields:

A disagreement hypothesis $\mathcal{H}_{dis,i}$ with pseudo-agreement rate:

$$\varepsilon_T(\hat{f} \mid c_i) > \min\left(\alpha, \frac{P_S(c_i)}{P_T(c_i)}\left(\varepsilon_S(\hat{f} \mid c_i) + d_{H,c_i}(D_S, D_T)\right)\right).$$

An agreement hypothesis $\mathcal{H}_{agr,i}$ with pseudo-agreement rate:

$$\varepsilon_T(\hat{f} \mid c_i) < \min\left(\alpha, \frac{P_S(c_i)}{P_T(c_i)}\left(\varepsilon_S(\hat{f} \mid c_i) + d_{H,c_i}(D_S, D_T)\right)\right).$$

In some embodiments, it is advantageous for these hypotheses to hold with high probability. In order to ensure that these hypotheses hold with high probability, $\hat{\varepsilon}_S(\hat{f}|c_i) = \sum_{i=1}^{n_s(c_i)} 1[\hat{f}(x) \neq y | x \in c_i]$ can be empirically calculated, where $n_s(c_i)$ is a number of source samples in cluster $c_i$. In addition, confidence intervals can be calculated such that $|\varepsilon_S(\hat{f}|c_i) - \hat{\varepsilon}_S(\hat{f}|c_i)| \leq CI(n_s(c_i))$. This calculation allows the agreement/disagreement hypotheses that hold with high probability to be defined:
Disagreement hypothesis $H_{dis,i}$ holding with high probability:

$$\varepsilon_T(\hat{f} \mid c_i) > \min\left(\alpha, \frac{P_S(c_i)}{P_t(c_i)}\left(\varepsilon_S(\hat{f} \mid c_i) + CI(n_S(c_i)) + d_{H,c_i}(D_S, H_T)\right)\right).$$

Agreement hypothesis $H_{agr,i}$ holding with high probability:

$$\varepsilon_T(\hat{f} \mid c_i) < \min\left(\alpha, \frac{P_S(c_i)}{P_T(c_i)}\left(\varepsilon_S(\hat{f} \mid c_i) - CI(n_S(c_i)) + d_{H,c_i}(D_S, D_T)\right)\right).$$

These hypotheses can be utilized in a MAB-AS algorithm in order to learn the disagreement/agreement clusters or regions.

MAB-AS Algorithm

Given the agreement/disagreement hypotheses, an algorithm that identifies the agreement and disagreement clusters generated by the source and target domain data is desirable. In addition, an algorithm that samples from the disagreement clusters as much as possible is desirable, so that the source predictor $\hat{f}$ can be adapted, using the revealed target examples to perform well on the target domain. The target data in agreement regions can simply be explained by the source classifier $\hat{f}$. Thus, in some embodiments, method 400 can optionally comprise activities of sampling the different portion of the target data of any clusters of the plurality of clusters determined to be the one or more disagreement clusters, and also creating a prediction model for the second product category using samples of (1) the different portion of the target data of any clusters of the plurality of clusters determined to be the one or more disagreement clusters, and also (2) a second set of rules.

In some embodiments, a MAB can be defined where each arm i corresponds to a cluster $c_i$. This approach is a novel application of the MAB. In addition, instead of choosing the arm that maximizes the total reward, the 'best' arms are the arms whose corresponding disagreement hypotheses hold. Each arm i is associated with an expectation $\mu_i$ that is initially unknown. In addition, each arm is associated with a hypothesis $H_i: \mu_i > \epsilon_i$ for some given threshold $\epsilon \in (0, 1)$. At each round t, the agent selects an action $A_t$ (a subset of arms) from the action set A: $\{A \subseteq [1, \ldots, K]\}$ and receives a stochastic observation $r_{i,t} \in \{0,1\}$ from each of the arms in $A_t$. A goal is to obtain observations from the set of "optimal" arms on which the disagreement hypotheses $H_{dis,i}$ hold. Therefore, the optimal action is defined as $A^*: \{i: \mu_i > \epsilon_i\}$.

In some embodiments, it is assumed that the rate of disagreement of the classifier in each cluster does not vary within the cluster. For example, a disagreement homogeneity can be assumed: for each $c_i \in K$, the disagreement rate $\mathbb{P}_{y \sim P_T(y|x)}[\hat{f}_S(x) \neq y | x \in c_i]$ is equal $\forall x \in c_i$. This assumption ensures that the random variable $1[\hat{f}_S(x) \neq y]$ for $x, y \sim P_T$ on $x \in c_i$ has a Bernoulli distribution with an expectation of $\mu_i = \epsilon_T(\hat{f}_S | c_i)$. Each arm i is therefore associated with a disagreement hypothesis $\mathcal{H}_{dis,i} \mu_i > \epsilon_i \in (0,1)$ and:

$$\varepsilon_i = \min\left(\alpha, \frac{P_S(c_i)}{P_T(c_i)}\left(\hat{\varepsilon}_S(\hat{f} \mid c_i) - CI(n_S(c_i)) + d_{Hc_i}(D_S, D_T)\right)\right).$$

As seen in the algorithm below, a Thompson Sampling approach can be applied where a Beta prior distribution and Bernoulli likelihood function are applied over the parameters $\mu_i$ at each round. Because these are conjugates, the new value $\theta_i$ at each round from the Beta posterior distribution can be sampled. An action $A_t$ can then be selected and arms chosen whose respective disagreement hypotheses $\theta_i > \epsilon_i$ hold. The stochastic reward observation $r_{i,t} \in \{0,1\}$ for arm $i \in A_t$ is:

$$r_{i,t} = 1[\hat{f}(x) \neq y | x, y \sim P_T]$$

In other words, when a disagreement hypothesis holds, a target example and its label can be revealed. If the source classifier predicts the incorrect label, then disagreement occurs. By the disagreement homogeneity assumption, the stochastic observation can be treated as a Bernoulli random variable. It also is important to note that a budget T of samples is provided that can be revealed because revealing target items are costly. The goal is to explain as much of the target data as possible, within a given budget.

In some embodiments, the first set of rules can further comprise an algorithm for adaptive sampling. For example, the first set of rules can comprise requiring $\epsilon_i$, i=1 ... K, and also performing, for t=1,2, ... rounds: for each arm i=1, 2, ... K, sampling $\theta_{i,t} \sim \text{Beta}(S_{i,t}+1, F_{i,t}+1)$; selecting action $A_t = \{i: \theta_{i,t} > \epsilon_i\}$; and for each $i \in A_t$: receiving stochastic reward observation $r_{i,t} \in \{0,1\}$; and if $r_{i,t}=1$, updating $S_{i,t}$, else updating $F_{i,t}$, wherein $S_{i,t}$ represents success of the arm i at a time t, $F_{i,t}$ represents failure of the arm i at the time t, and $\epsilon_i$ is $$\min\left(\alpha, \frac{P_S(c_i)}{P_T(c_i)}\left(\hat{\varepsilon}_S(\hat{f} \mid c_i) - CI(n_S(c_i)) + d_{Hc_i}(D_S, D_T)\right)\right).$$

The first set of rules also can comprise labeling a target label of the different portion of the target data in the cluster $c_i$ a success if the target label is revealed and $r_{i,t}=1$ and the source classifier predicts the target label incorrectly. The first set of rules also can comprise labeling the target label of the different portion of the target data in the cluster $c_i$ a failure if the target label is revealed and $r_{i,t}=0$ and the source classifier predicts the target label correctly. For example, in some embodiments, the first set of rules further comprises: (1) running a multi-armed bandit (MAB), wherein each arm of the MAB (1) corresponds to a cluster of the plurality of clusters and (2) a distribution is maintained that describes a current likelihood of the cluster corresponding to the arm being a disagreement cluster; (2) initializing each arm of a plurality of arms of the MAB; and (3) performing, for t=1, 2, . . . rounds, including selecting action $A_t$ comprising choosing a subset of the plurality of arms, and for each arm i∈$A_t$: receiving a stochastic reward observation $r_{i,t}$∈{0, 4} and updating a distribution associated with arm i based on the observation $r_{i,t}$. In some embodiments, receiving the stochastic reward observation $r_{i,t}$∈{0,1} can comprise: selecting an unlabeled target example from a cluster corresponding to arm i; and revealing a label of the unlabeled target example as selected. In some embodiments, receiving the stochastic reward observation $r_{i,t}$∈{0,1} also can comprise: receiving $r_{i,t}$=1 if the source classifier predicts the label of the unlabeled target example as revealed incorrectly; and receiving $r_{i,t}$=0 if the source classifier predicts the label of the unlabeled target example as revealed correctly.

Moreover, in some embodiments, the first set of rules can comprise initializing for each cluster $c_i$ of the plurality of clusters: $\epsilon_i$ is an agreement threshold for the cluster $c_i$; $S_{i,1}$ is a number of products in the second product category that (1) are in cluster $c_i$, (2) comprise a label that is available, and (3) comprise a label that is not correctly predicted by the source classifier; and $F_{i,1}$ is a number of products in the second product category that are (1) in cluster $c_i$, (2) comprise a label that is available, and (3) comprise a label that is correctly predicted by the source classifier. The first set of rules can further comprise performing, for t=1,2, . . . rounds: for each cluster of the plurality of clusters i=1,2, . . . K, sampling $\theta_{i,t}$~Beta($S_{i,t}$+1, $F_{i,t}$+1); selecting action $A_t$={i:$\theta_{i,t}$>$\epsilon_i$}; receiving a stochastic reward observation $r_{i,t}$∈{0,1}; and for each i∈$A_t$:if $r_{i,t}$=1, updating $S_{i,t+1}$=$S_{i,t}$+1 and $F_{i,t+1}$=$F_{i,t}$, else updating $S_{i,t+1}$=$S_{i,t}$ and $F_{i,t+1}$=$F_{i,t}$+1.

Active Sampling Bound

By running an active sampling algorithm, a goal can be to identify agreement clusters and disagreement clusters. In some embodiments a goal can be to sample from disagreement clusters as much as possible, as the agreement clusters can be explained by the source classifier $\hat{f}$. As such, establishing bounds for the number of times suboptimal arms will be chosen is desirable. A suboptimal action is any action that includes an arm on which the hypothesis does not hold or excludes an arm on which it does hold. The bound is presented as the first theorem, below.

In some embodiments, the first theorem pertains to suboptimal arms. For example, method 400 can comprise an activity of establishing limits for a number of times one or more suboptimal arms are chosen for sampling using a third set of rules. In some embodiments, the third set of rules comprise constants b, c>0, B($\mu_i$, $\epsilon_i$, c) and D($\mu_i$, $\epsilon_i$) such that for any $\epsilon$≥0 and values $\{\epsilon_i\}_{i=1}^K$ the expected number of times an arm is sampled by time T is:

$$\sum_{A\in\mathcal{A}\setminus A_\epsilon^*} \mathbb{E}[N_{A,T}] \leq$$

$$\sum_{i\in S_\epsilon^-} \left( \frac{(1+c)(\ln(T)+\ln(\ln(T)))}{K(\beta(u_i),\beta(\varepsilon_i))} + 1 + \beta(\mu_i, \varepsilon_i, c) \right) + \sum_{i\in S_\epsilon^+} D(\mu_i, \varepsilon_i, b).$$

In the third set of rules, b, c≥0 are constants greater than 0, $\mu_i$ is an expectation of the $i^{th}$ arm corresponding to a target error of a cluster of the $i^{th}$ arm, $\beta(\epsilon_i)$ is a Bernoulli likelihood with respect to $\epsilon_i$, $\beta(\mu_i)$ is a Bernoulli likelihood with respect to $\mu_i$, B($\mu_i$, $\beta_i$, c) is a first upper bound constant corresponding to thei proof, D($\mu_i$, $\beta_i$, b) is a second upper bound constant corresponding to the proof, A is a set of sub-optimal actions corresponding to a set of disagreement clusters, $A_\epsilon^*$ is a set of approximately optimal actions, $\mathcal{A}\setminus A_\epsilon^*$ are all actions that are not in the set of approximately optimal actions, $\mathbb{E}[N_{A,T}]$ is an expected number of times the sub-optimal action A is selected at the time T, $S_\epsilon^-$ is a set of approximately optimal actions that fulfill the agreement hypothesis, $S_\epsilon^+$ is a set of approximately optimal actions that fulfill the disagreement hypothesis, the time T is a time corresponding to a number of rounds for which a Multi-Armed Bandit has been executing, and K($\beta(\mu_i),\beta(\epsilon_i)$) is a KL divergence between the Bernoulli likelihood with respect to $\mu_i$ and the Bernoulli likelihood with respect to $\epsilon_i$.

Learning Bounds

Once an active sampling algorithm has been applied, knowledge of the agreement and disagreement clusters can be obtained with high probability. The set of agreement clusters can be denoted as $C_{agr}$, and the target error of a hypothesis h on the agreement clusters can be defined as:

$$\varepsilon_{T,agr}(h) = \sum_{c_i\in C_{agr}} \varepsilon_{T,c_i(h)},$$

and the set of disagreement clusters can be denoted as $C_{dis}$, and the target error of a hypothesis h on the disagreement clusters can be defined as:

$$\varepsilon_{T,dis}(h) = \sum_{c_i\in C_{dis}} \varepsilon_{T,c_i(h)}.$$

For the agreement regions, binding or limiting the error of the source classifier $\hat{f}$ on the target data is desirable.

In some embodiments, the second theorem relates to error on agreement clusters and/or disagreement clusters. As part of the second theorem, under the disagreement homogeneity assumption, for any δ, δ'∈(0,1), and hypothesis class $\mathcal{H}$ with finite Vapnik-Chervonenkis (VC) dimension d, with a probability of at least 1-δ-|$C_{agr}$|δ' the error of the source empirical risk minimization (ERM) $\hat{f}$:=argmin$_{h\in\mathcal{H}}$ min$_{h\in\mathcal{H}}$ $\hat{\epsilon}_s$(h) on the target agreement clusters is:

$$\varepsilon_{T,agr}(\hat{f}) \leq \min\left(\alpha, \varepsilon_S(f^*) + d_{H,agr}(D_S, D_T) + 4\sqrt{2\frac{d\log\left(\frac{2en_s}{d}\right)+\log\frac{4}{\delta}}{n_s}}\right),$$

where α is the pseudo disagreement parameter and $d_{H,agr}$ ($D_S$, $D_T$) is the $\mathcal{H}$-distance.

Thus, in some embodiments, method 400 can comprise an activity of bounding an agreement error of the source classifier $\epsilon_{T,agr}(\hat{f})$ on the different portion of the target data in any cluster of the plurality of clusters determined to be the one or more agreement clusters using a fourth set of rules. The fourth set of rules can comprise: assume for each $c_i$∈K, a disagreement rate $\mathbb{P}_{y\sim P_T(y|x)}[\hat{f}(x) \neq y|x\in c_i]$ equal ∀x∈$c_i$; and for any δ, δ'∈(0,1), and hypothesis class $\mathcal{H}$ with finite VC dimension d, with a probability at least 1-ε-|$C_{agr}$|δ' an error of the source classifier ERM $\hat{f}$:=agrmin$_{h\in\mathcal{H}}$ $\hat{\epsilon}_s$(h) on a cluster determined to be the one or more agreement clusters is $$\varepsilon_{T,agr}(\hat{f}) \le \min\left(\alpha, \varepsilon_S(f^*) + d_{H,agr}(D_S, D_T) + 4\sqrt{2\frac{d\log\left(\frac{2en_s}{d}\right) + \log\frac{4}{\delta}}{n_s}}\right)$$

In the fourth set of rules, $\hat{f}$ is a source ERM function, $\varepsilon_{T,agr}(\hat{f})$ is a target error of the ERM function $\hat{f}$ on target data of the one or more agreement clusters, $f^*$ is an optimal ERM function, $\alpha$ is a pseudo-disagreement parameter, $\varepsilon_S(f^*)$ is a source error of the optimal ERM function $f^*$ on the labeled source training data, $d_{H,agr}(D_S, D_T)$ is the $\mathcal{H}$-distance for the clusters determined to be the one or more agreement clusters, d is a VC dimension, e is a mathematical constant, $n_s$ is a number of samples of the labeled source training data, and $\delta$ is a confidence constant.

In some embodiments, method 400 further can comprise an activity 440 of receiving a product search request from a user of the web site of the online retailer for a product of the plurality of second products in the second product category. The product can be referred to as an undiscovered product because little or no data exists regarding the selling performance of the product. The product search request can comprise a search query for a generic product similar to the undiscovered second product, a search query for a specific product similar to the undiscovered second product, a product search request to return products within a certain category, etc.

In some embodiments, method 400 also can comprise an activity 445 of coordinating a display of the product on the website of the online retailer to promote the product of the plurality of second products in the second product category on the website of the online retailer according to any clusters of the plurality of clusters determined to comprise the one or more agreement clusters. Promoting products in the undiscovered second product category can be achieved in a number of ways. For example, in some embodiments, promoting an undiscovered second product category can comprise ranking of products in the second product category, including undiscovered products, based on a score. More particularly, an undiscovered product in the second product category can have its score boosted through use of the systems and methods described herein. This boosting of the scores moves the undiscovered second product higher or lower in the search results. In some embodiments, the amount of score boost could depend on the performance estimate for the product or on the performance estimate for the product relative to the performance estimates of the other products on the search results page.

Furthermore, in some embodiments, promoting an undiscovered second product can comprise reserving certain positions (or ranks) on a search results page for one or more promoted products. An undiscovered product can be promoted to one of the reserved positions (assuming it was below that position in the initial ranking) based on the systems and methods described herein. The eligibility of the undiscovered item to be promoted could depend on the performance estimate for the product or on the performance estimate for the product relative to the performance estimates of the other products on the search results page.

In some embodiments, guardrails that prevent an undiscovered product from being promoted if it falls outside the guardrails are utilized in order to ensure that only undiscovered products that are relevant to the user query are promoted. Non-limiting examples of the guardrails comprise: (1) a query categorization service that categorizes each query into one or more categories; a product may only be promoted for a given query if its assigned product category matches the category of the query; (2) a product type categorization service categorizes each query into one or more product types (for example, by identifying the product types of the top n products in the initial ranking of the search results for the query); a product may only be promoted for a given query if its assigned product type matches one of the product types of the query; and/or (3) a price range identification service assigns a price range to each query (for example, based on the prices of the top n products in the initial ranking of the search results for the query); a product may only be promoted for a given query if its price falls within price range for the query.

Method 400 can further comprise an activity of retrieving information about the first and/or second products from a central database associated with the online retailer. In some embodiments, retrieving information can comprise using a distributed network comprising distributed memory architecture to retrieve information about the products. This distributed architecture network can reduce the impact on network and system resources to reduce congestion in bottlenecks, while still allowing data to be accessible from a central location. In some embodiments retrieving information is performed while a user is shopping on a website of the online retailer, i.e. when a user enters a product search request, browses categories of products, and/or sorts products. In some embodiments, retrieving information is performed when system 300 (FIG. 3) uses transfer learning with active sampling to promote the undiscovered second product.

FIG. 5 illustrates a block diagram of a portion of system 300 comprising transfer learning system 310, web server 320, and display system 360, according to the embodiment shown in FIG. 3. Each of transfer learning system 310, web server 320, and display system 360, is merely exemplary and not limited to the embodiments presented herein. Each of transfer learning system 310, web server 320, and/or display system 360, can be employed in many different embodiments or examples not specifically depicted or described herein. In some embodiments, certain elements or modules of transfer learning system 310, web server 320, and/or display system 360, can perform various procedures, processes, and/or acts. In other embodiments, the procedures, processes, and/or acts can be performed by other suitable elements or modules.

In many embodiments, transfer learning system 310 can comprise non-transitory storage module 512. Memory storage module 512 can be referred to as training module 512. In many embodiments, training module 512 can store computing instructions configured to run on one or more processing modules and perform one or more acts of method 400 (FIG. 4) (e.g., activity 405 of training a source classifier with labeled source training data of a first product category from a web site of an online retailer (FIG. 4)).

In many embodiments, transfer learning system 310 also can comprise non-transitory storage module 514. Memory storage module 514 can be referred to as clustering module 514. In many embodiments, clustering module 514 can store computing instructions configured to run on one or more processing modules and perform one or more acts of method 400 (FIG. 4) (e.g., activity 410 of clustering target data for a second product category into a plurality of clusters such that each cluster of the plurality of clusters comprises a different portion of the target data, and activity 415 of inserting into each cluster of the plurality of clusters a different holdout set of source data from the labeled source training data of the first product category (FIG. 4)).

In many embodiments, transfer learning system 310 further can comprise non-transitory storage module 516. Memory storage module 516 can be referred to as domain discriminator module 516. In many embodiments, domain discriminator module 516 can store computing instructions configured to run on one or more processing modules and perform one or more acts of method 400 (FIG. 4) (e.g., activity 420 of training a domain discriminator using a first additional holdout set of source data from the labeled source training data and a second additional holdout set of source data from the target data, activity 425 of assigning a domain discriminator score to each cluster of the plurality of clusters by calculating an approximate H-distance between the different holdout set of source data and the different portion of the target data within each cluster of the plurality of clusters, activity 430 of determining an agreement threshold for each cluster of the plurality of clusters based in part on the domain discriminator score; and activity 435 of determining whether each cluster of the plurality of clusters comprises an agreement cluster of one or more agreement clusters or a disagreement cluster of one or more disagreement clusters using the agreement threshold for each cluster of the plurality of clusters and a first set of rules (FIG. 4)).

In many embodiments, display system 360 can comprise non-transitory storage module 562. Memory storage module 562 can be referred to as display module 562. In many embodiments, display module 562 can store computing instructions configured to run on one or more processing modules and perform one or more acts of method 400 (FIG. 4) (e.g., activity 445 of coordinating a display of the product of the plurality of second products of the second product category on the website of the online retailer to promote the product (FIG. 4)).

In many embodiments, web server 320 can comprise non-transitory storage module. Memory storage module can be referred to as a communication module. In many embodiments, the communication module can store computing instructions configured to run on one or more processing modules and perform one or more acts of method 400 (FIG. 4) (e.g., activity 440 of receiving a product search request from a user of the website of the online retailer for a product in the second product category that belongs to one of the plurality of clusters determined to comprise the one or more agreement clusters (FIG. 4)).

Experiments

ASTraL, as well as the baseline approaches, was applied to two different sets of data: (1) 20 Newsgroups dataset and (2) real-world data from an online retailer. In each experiment, a large set of labeled source data was made available to each of the compared approaches. In addition, a budget for sampling labels from a pool of target data was provided. Utilizing the actively sampled target data from the ASTraL algorithm, the performance of the adapted classifier on the target domain data to the baseline approaches was compared. In each experiment, it was shown that ASTraL's adapted classifier yields superior performance. The performance criterion is the $f1$-score.

The compared approaches include: (1) Source—the source classifier $\hat{f}$ evaluated on the target data; (2) C-rand—a classifier trained on the source data and randomly revealed target labels (for a given budget); (3) ALDA; (4) HATL; (5) E-ASTraL, which is an ensemble classifier comprising (i) a classifier trained on the source data and ASTraL revealed labeled target data; and (ii) a classifier trained only on the ASTraL revealed target data (before classification, the test data was fed into the clusters; test data falling into agreement and disagreement regions was classified using (i) and (ii) respectively); and (6) Skyline, a classifier trained on all of the target data with ground truth labels.

Transfer problems were considered for a 20 Newsgroup sentiment classification and an e-commerce data set for an online retailer. The problems and examples provided below are non-limiting.

20 Newsgroup Sentiment Classification: The 20 Newsgroups dataset included more than 18,000 documents on 20 topics that partitioned into 7 high-level categories. The high-level categories include comp, rec, sci, misc, talk, soc, alt. A sentiment binary classification task was created where the source was defined as having 3 of the 7 categories as having positive labels and the remaining 4 categories as having negative labels. The target domain represents a change in user preferences (conditional output distribution) where one of the positive categories has been swapped to a negative category. In this way, 10 user preference tasks were generated. Features: The headers and footers of each mail were removed and the data was converted to TF-IDF features. Source Classifier: A logistic classifier. Clustering: Standard K-means clustering with K=20. Dimensionality reduction was performed in each case using SVD to 50 components prior to performing the clustering step to reduce noise.

Thirty independent trials of each of the 20 news-groups datasets were run. In each case, E-ASTRAL attained a significantly higher $f1$-score compared to the baseline approaches. E-ASTraL approached the skyline as the budget increased and outperformed C-rand once a budget of 300 was attained.

E-commerce dataset of an online retailer: The e-commerce dataset of an online retailer comprised 5 product categories generated from the online retailer's product taxonomy. The categories included: 0—All Men's T-shirts; 1—All Women's T-shirts; 3—Car and Truck Tires; 20—All Women's Shoes; 21—All Men's Shoes. Each category comprised at least 5,000 products with a large number of user views for each product. A binary classification task was created with labels defined according to a purchasing score S computed based on internal metrics of the online retailer, that is a proxy for the likelihood that the product will be purchased if presented to a user. Products whose S was lower than a pre-defined threshold were assigned the label 0 (low purchasing score) and items above this score were assigned the label 1 (high purchasing score). All in all, 8 source-target combinations were created between the categories. Features: The titles of the products were converted to TF-IDF features. Example titles include the brand, product type, color and gender (if relevant) of a particular item. Example titles from Men's Shoes include NIKE® Men's Legend Status T-Shirt Black or NEW BALANCE® Men's Running Shoes Red. Source Classifier: A standard logistic classifier. Clustering: Hierarchical Bisecting K-means clustering with K=4. Dimensional reduction was performed prior to clustering using SVD to 2 components.

Thirty independent trials of ASTraL on the Walmart dataset were run. As is the case for most e-commerce websites, there were many moderate to low performing items and some high performing items. As a result, the data is skewed, and the $f1$-score again provides a better estimate of the adapted classifier performance. E-ASTraL significantly outperformed C-rand in each case, and outperformed ALDA and HATL on 6 out of 8 datasets.

Auto-encoder features: Each of the previous experiments was run using TF-IDF features. However, a joint feature representation learned on both the source and target data may provide useful features for domain adaptation. A deep stacked-convolutional auto-encoder was built. Unlabeled source and target data (product titles) were first pre-processed through a fixed, random word embedding. The resulting word vectors then formed a matrix which was fed as input into the convolutional auto-encoder. One-hundred-twenty-eight convolutional filters with the same dimension as the matrix columns were then applied to the matrix resulting in a 128×29 volume. A non-linear layer was applied, followed by an inverse non-linear layer and a 128 filter deconvolutional layer. The loss function is the reconstruction error. Using this architecture, 8 stacked-convolutional auto-encoders for 400 epochs were trained, and the hidden weights were used as a shared feature representation. Using these weights, ASTraL significantly outperformed the baseline methods (and specifically C-rand with a p-value<0.05). As the budget increased, ASTraL's performance approached that of the skyline classifier.

Some embodiments of the ASTraL framework described herein perform domain adaptation (transfer learning) by actively sampling target labels in clusters of disagreement. This framework can utilize a novel MAB-AS algorithm to learn agreement and disagreement clusters by revealing target labels in clusters where the disagreement hypotheses hold. MAB-AS can utilize a bound on the number of times a sub-optimal action will be selected. In addition, an error bound on the agreement clusters also is provided. An embodiment of this algorithm has been tested on both the 20 Newsgroups datasets as well as on 8 e-commerce source-target category datasets of an online retailer. In each case, E-ASTraL outperformed an adapted classifier trained on a random set of revealed target labels (i.e., C-rand). In addition, ASTraL outperformed a number of additional baseline approaches in most of the datasets. A shared feature representation using a deep stacked auto-encoder and ASTraL outperformed the baseline approaches in each dataset of the online retailer using this shared feature representation.

Although systems and methods for promoting products in product search results using transfer learning with active sampling have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory storage devices storing computing instructions configured to run on the one or more processors and perform:
training a source classifier with labeled source training data of a first product category from a website of an online retailer, the labeled source training data being based on a plurality of first products in the first product category;
clustering target data for a second product category into a plurality of clusters such that each respective cluster of the plurality of clusters comprises a different respective portion of the target data, the target data being based on a plurality of second products in the second product category;
inserting into each respective cluster of the plurality of clusters a different respective holdout set of source data from the labeled source training data of the first product category;
assigning a respective domain discriminator score to each respective cluster of the plurality of clusters;
determining whether each respective cluster of the plurality of clusters comprises a respective agreement cluster of one or more agreement clusters or a respective disagreement cluster of one or more disagreement clusters using the respective domain discriminator score for each respective cluster of the plurality of clusters and a first set of rules, wherein:
the different respective portion of the target data within each respective agreement cluster of the one or more agreement clusters is explained by the source classifier; and
the different respective portion of the target data within each respective disagreement cluster of the one or more disagreement clusters is not explained by the source classifier;
receiving a product search request from a user of the website of the online retailer, the product search request being for a product;
when the product is in the respective agreement cluster of the one or more agreement clusters, causing an electronic device of the user of the website of the online retailer to display one or more products as determined by the source classifier; and
when the product is in the respective disagreement cluster of the one or more disagreement clusters, causing the electronic device of the user of the website of the online retailer to display at least one product as determined by active sampling in the respective disagreement cluster.

2. The system of claim 1, wherein the different respective holdout set of the source data within each respective cluster of the plurality of clusters comprises:
(1) data indicating a high probability of one or more first products of the first product category being sold; and (2) data indicating a low probability of one or more second products of the first product category being sold.

3. The system of claim 1, wherein assigning the respective domain discriminator score to each respective cluster of the plurality of clusters comprises:
training a domain discriminator using a first additional holdout set of the source data from the labeled source training data and a second additional holdout set of data from the target data; and
using the respective domain discriminator score and a loss function to approximate an H-distance between the different respective holdout set of the source data of the labeled source training data and the different respective portion of the target data within each respective cluster of the plurality of clusters, wherein a small H-distance indicates more similarity between the different respective holdout set of the source data of the labeled source training data and the different respective portion of the target data in each respective cluster of the plurality of clusters than a large H-distance that is larger than the small H-distance.

4. The system of claim 3, wherein the loss function comprises one of:
a hinge loss function;
a negative logarithmic loss function;
a cross entropy loss function;
a Huber loss function;
a modified Huber loss function;
an exponential loss function;
a mean absolute deviation; or
a Kullback-Leibler divergence.

5. The system of claim 3, wherein the first set of rules comprises a disagreement hypothesis and an agreement hypothesis.

6. The system of claim 5, wherein:
the disagreement hypothesis comprises:

$$\varepsilon_T(\hat{f} \mid c_i) > \frac{P_S(c_i)}{P_T(c_i)}(\varepsilon_S(\hat{f} \mid c_i) + d_{H,c_i}(D_S, D_T));$$

and the agreement hypothesis comprises:

$$\varepsilon_T(\hat{f} \mid c_i) \leq \frac{P_S(c_i)}{P_T(c_i)}(\varepsilon_S(\hat{f} \mid c_i) + d_{H,c_i}(D_S, D_T)),$$

where:
$\varepsilon_T$ is an error of the source classifier $\hat{f}$ on the target data in a cluster $c_i$ of the plurality of clusters;
$P_s(c_i)$ is an input distribution of the different respective holdout set of the source data of the labeled source training data in the cluster $c_i$;
$\varepsilon_s$ is an error of the source classifier $\hat{f}$ of the different respective portion of the source data in the cluster $c_i$ of the plurality of clusters;
$P_T(C_i)$ is an input distribution of the different respective portion of the target data in the cluster $c_i$;
$\varepsilon_s$ is an error of the source classifier $\hat{f}$ on the source data in the cluster $c_i$ of the plurality of clusters; and
$d_{H,c_i}(D_S, D_T)$ is the H-distance between the different respective holdout set of the source data from labeled source training data $D_s$ and the different respective portion of target data $D_T$ for the cluster $c_i$.

7. The system of claim 6, wherein the one or more non-transitory storage devices storing the computing instructions are further configured to run on the one or more processors and perform:
sampling the different respective portion of the target data of any clusters of the plurality of clusters determined to be the one or more disagreement clusters; and
creating a prediction model for the second product category using samples of (1) the different respective portion of the target data of any clusters of the plurality of clusters determined to be the one or more disagreement clusters, and also (2) a second set of rules.

8. The system of claim 3, wherein the one or more non-transitory storage devices storing the computing instructions are further configured to run on the one or more processors and perform:
assigning an agreement threshold to each respective cluster of the plurality of clusters by computing $$\varepsilon_i = \min\left(\alpha, \frac{P_S(c_i)}{P_T(c_i)}(\hat{\varepsilon}_S(\hat{f} \mid c_i) - CI(n_S(c_i)) + d_{Hc_i}(D_S, D_T))\right),$$

where:
α is a pseudo disagreement parameter;
$P_s(c_i)$ is an input distribution of the different respective holdout set of the source data of the labeled source training data in a cluster $c_i$;
$P_T(C_i)$ is an input distribution of the different respective portion of the target data in the cluster $c_i$, CI is a confidence interval;
$n_s(c_i)$ is a number of samples of the different respective holdout set of data of the labeled source training data in the cluster $c_i$; and
$d_{H,c_i}(D_S, D_T)$ is the H-distance as approximated between the different respective holdout set of the source data from labeled source training data $D_s$ and the different respective portion of target data $D_T$ for the cluster $c_i$.

9. The system of claim 3, wherein the first set of rules comprises:
running a multi-armed bandit (MAB), wherein each arm of the MAB (1) corresponds to a cluster of the plurality of clusters and (2) has a maintained distribution that describes a current likelihood of the cluster corresponding to the arm being a disagreement cluster;
initializing each arm of a plurality of arms of the MAB; and
performing, for t=1, 2, . . . rounds:
selecting action $A_t$ comprising choosing a subset of the plurality of arms; and
for each arm $i \in A_t$:
receiving a stochastic reward observation $r_{i,t} \in \{0,1\}$; and
updating the maintained distribution associated with arm i based on the stochastic reward observation $r_{i,t}$.

10. The system of claim 9, wherein receiving the stochastic reward observation $r_{i,t}$ E $\{0,1\}$, $i \in A_t$ comprises:
selecting an unlabeled target example from a cluster corresponding to arm i; and
revealing a label of the unlabeled target example as selected.

11. The system of claim 10, wherein receiving the stochastic reward observation $r_{i,t} \in \{0,1\}$, $i \in A_t$ further comprises:

receiving $r_{i,t}=1$ when the source classifier predicts the label of the unlabeled target example as revealed incorrectly; and receiving $r_{i,t}=0$ when the source classifier predicts the label of the unlabeled target example as revealed correctly.

12. The system of claim 3, wherein the first set of rules comprises:
  initializing for each respective cluster $c_i$ of the plurality of clusters:
    $\varepsilon_i$ is an agreement threshold for the cluster $c_i$;
    $S_{i,1}$ is a number of products in the second product category that (1) are in cluster $c_i$, (2) comprise a label that is available, and (3) comprise a label that is not correctly predicted by the source classifier; and
    $F_{i,1}$ is a number of products in the second product category that are (1) in cluster $c_i$, (2) comprise a label that is available, and (3) comprise a label that is correctly predicted by the source classifier;
  performing, for t=1, 2, . . . rounds:
    for each respective cluster of the plurality of clusters i=1, 2, . . . K, sampling $\theta_{i,t}$~Beta($S_{i,t}$+1, $F_{i,t}$+1);
    selecting action $A_t=\{i: \theta_{i,t}>\varepsilon_i\}$; and
    for each $i \in A_t$:
      receiving a stochastic reward observation $r_{i,t} \in \{0,1\}$, $i \in A_t$; and
      when $r_{i,t}=1$, updating $S_{i,t+1}=S_{i,t}+1$ and $F_{i,t+1}=F_{i,t}$, else updating $S_{i,t+1}=S_{i,t+1}$ and $F_{i,t+1}=F_{i,t}+1$.

13. A method comprising:
  training a source classifier with labeled source training data of a first product category from a website of an online retailer, the labeled source training data being based on a plurality of first products in the first product category;
  clustering target data for a second product category into a plurality of clusters such that each respective cluster of the plurality of clusters comprises a different respective portion of the target data, the target data being based on a plurality of second products in the second product category;
  inserting into each respective cluster of the plurality of clusters a different respective holdout set of source data from the labeled source training data of the first product category;
  assigning a respective domain discriminator score to each respective cluster of the plurality of clusters;
  determining whether each respective cluster of the plurality of clusters comprises a respective agreement cluster of one or more agreement clusters or a respective disagreement cluster of one or more disagreement clusters using the respective domain discriminator score for each respective cluster of the plurality of clusters and a first set of rules, wherein:
    the different respective portion of the target data within each respective agreement cluster of the one or more agreement clusters is explained by the source classifier; and
    the different respective portion of the target data within each respective disagreement cluster of the one or more disagreement clusters is not explained by the source classifier;
  receiving a product search request from a user of the website of the online retailer, the product search request being for a product of the plurality of second products in the second product category;
  when the product is in the respective agreement cluster of the one or more agreement clusters, causing an electronic device of the user of the website of the online retailer to display one or more products as determined by the source classifier; and
  when the product is in the respective disagreement cluster of the one or more disagreement clusters, causing the electronic device of the user of the website of the online retailer to display at least one product as determined by active sampling in the respective disagreement cluster.

14. The method of claim 13, wherein the different respective holdout set of the source data within each respective cluster of the plurality of clusters comprises:
  (1) data indicating a high probability of one or more first products of the first product category being sold; and
  (2) data indicating a low probability of one or more second products of the first product category being sold.

15. The method of claim 13, wherein assigning the respective domain discriminator score to each respective cluster of the plurality of clusters comprises:
  training a domain discriminator using a first additional holdout set of the source data from the labeled source training data and a second additional holdout set of data from the target data; and
  using the respective domain discriminator score and a loss function to approximate an H-distance between the different respective holdout set of the source data of the labeled source training data and the different respective portion of the target data within each respective cluster of the plurality of clusters, wherein a small H-distance indicates more similarity between the different respective holdout set of the source data of the labeled source training data and the different respective portion of the target data in each respective cluster of the plurality of clusters than a large H-distance that is larger than the small H-distance.

16. The method of claim 15, wherein the loss function comprises one of:
  a hinge loss function;
  a negative logarithmic loss function;
  a cross entropy loss function;
  a Huber loss function;
  a modified Huber loss function;
  an exponential loss function;
  a mean absolute deviation; or
  a Kullback-Leibler divergence.

17. The method of claim 15, wherein the first set of rules comprises a disagreement hypothesis and an agreement hypothesis.

18. The method of claim 17, wherein:
  the disagreement hypothesis comprises:

$$\varepsilon_T(\hat{f} \mid c_i) > \frac{P_S(c_i)}{P_T(c_i)}\left(\varepsilon_S(\hat{f} \mid c_i) + d_{H,c_i}(D_S, D_T)\right);$$

and the agreement hypothesis comprises:

$$\varepsilon_T(\hat{f} \mid c_i) \leq \frac{P_S(c_i)}{P_T(c_i)}\left(\varepsilon_S(\hat{f} \mid c_i) + d_{H,c_i}(D_S, D_T)\right),$$

where:
    $\varepsilon_T$ is an error of the source classifier $\hat{f}$ on the target data in a cluster $c_i$ of the plurality of clusters;

$P_s(c_i)$ is an input distribution of the different respective holdout set of the source data of the labeled source training data in the cluster $c_i$;

$\varepsilon_s$ is an error of the source classifier $\hat{f}$ of the different respective portion of the source data in the cluster $c_i$ of the plurality of clusters;

$P_T(C_i)$ is an input distribution of the different respective portion of the target data in the cluster $c_i$;

$\varepsilon_s$ is an error of the source classifier $\hat{f}$ on the source data in the cluster $c_i$ of the plurality of clusters; and $d_{H,C_i}(D_s, D_T)$ is the H-distance between the respective different holdout set of the source data from labeled source training data $D_s$ and the different respective portion of target data $D_T$ for the cluster $c_i$.

19. The method of claim 18, further comprising:
sampling the different respective portion of the target data of any clusters of the plurality of clusters determined to be the one or more disagreement clusters; and
creating a prediction model for the second product category using samples of (1) the different respective portion of the target data of any clusters of the plurality of clusters determined to be the one or more disagreement clusters, and also (2) a second set of rules.

20. The method of claim 15, further comprising:
assigning an agreement threshold to each respective cluster of the plurality of clusters by computing $$\varepsilon_i = \min\left(\alpha, \frac{P_S(c_i)}{P_T(c_i)}\left(\hat{\varepsilon}_S(\hat{f} \mid c_i) - CI(n_S(c_i)) + d_{H c_i}(D_S, D_T)\right)\right),$$

where:
α is a pseudo disagreement parameter;
$P_s(c_i)$ is an input distribution of the different respective holdout set of the source data of the labeled source training data in a cluster $c_i$;
$P_T(C_i)$ is an input distribution of the different respective portion of the target data in the cluster $c_i$;
CI is a confidence interval;
$n_s(c_i)$ is a number of samples of the different respective holdout set of data of the labeled source training data in the cluster $c_i$; and
$d_{H,c_i}(D_s, D_T)$ is the H-distance as approximated between the different respective holdout set of the source data from labeled source training data $D_s$ and the different respective portion of target data $D_T$ for the cluster $c_i$.

21. The method of claim 15, wherein the first set of rules comprises:
running a multi-armed bandit (MAB), wherein each arm of the MAB (1) corresponds to a cluster of the plurality of clusters and (2) has a maintained distribution that describes a current likelihood of the cluster corresponding to the arm being a disagreement cluster;
initializing each arm of a plurality of arms of the MAB; and
performing, for t=1, 2, . . . rounds:
selecting action $A_t$ comprising choosing a subset of the plurality of arms; and
for each arm $i \in A_t$:
receiving a stochastic reward observation $r_{i,t} \in \{0,1\}$; and
updating the maintained distribution associated with arm i based on the stochastic reward observation $r_{i,t}$.

22. The method of claim 21, wherein receiving the stochastic reward observation $r_{i,t} \in \{0,1\}$, $i \in A_t$ comprises:
selecting an unlabeled target example from a cluster corresponding to arm i; and
revealing a label of the unlabeled target example as selected.

23. The method of claim 22, wherein receiving the stochastic reward observation $r_{i,t} \in \{0,1\}$, $i \in A_t$ further comprises:
receiving $r_{i,t}=1$ when the source classifier predicts the label of the unlabeled target example as revealed incorrectly; and
receiving $r_{i,t}=0$ when the source classifier predicts the label of the unlabeled target example as revealed correctly.

24. The method of claim 15, wherein the first set of rules comprises:
initializing for each respective cluster $c_i$ of the plurality of clusters:
$\varepsilon_i$ is an agreement threshold for the cluster $c_i$;
$S_{i,1}$ is a number of products in the second product category that (1) are in cluster $c_i$, (2) comprise a label that is available, and (3) comprise a label that is not correctly predicted by the source classifier; and
$F_{i,1}$ is a number of products in the second product category that are (1) in cluster $c_i$, (2) comprise a label that is available, and (3) comprise a label that is correctly predicted by the source classifier;
performing, for t=1, 2, . . . rounds:
for each respective cluster of the plurality of clusters i=1, 2, . . . K, sampling $\theta_{i,t} \sim \text{Beta}(S_{i,t}+1, F_{i,t}+1)$;
selecting action $A_t = \{i: \theta_{i,t} > \varepsilon_i\}$; and
for each $i \in A_t$:
receiving a stochastic reward observation $r_{i,t} \in \{0,1\}$, $i \in A_t$; and
when $r_{i,t}=1$, updating $S_{i,t+1}=S_{i,t}+1$ and $F_{i,t+1}=F_{i,t}$, else updating $S_{i,t+1}=S_{i,t}$ and $F_{i,t+1}=F_{i,t}+1$.

* * * * *